Dec. 12, 1967 M. ARTZT 3,357,533

PRINTER HAVING PRINT BARS WITH ZIGZAG STRUTS OUT OF PHASE

Filed Aug. 6, 1965 5 Sheets-Sheet 1

INVENTOR.
MAURICE ARTZT
BY John V. Regan
Attorney

PRINTER HAVING PRINT BARS WITH ZIGZAG STRUTS OUT OF PHASE

Filed Aug. 6, 1965 5 Sheets-Sheet 2

INVENTOR.
MAURICE ARTZT
BY John V. Regan
Attorney

Dec. 12, 1967 M. ARTZT 3,357,533

PRINTER HAVING PRINT BARS WITH ZIGZAG STRUTS OUT OF PHASE

Filed Aug. 6, 1965 5 Sheets-Sheet 3

INVENTOR.
MAURICE ARTZT
BY John V. Regan
ATTORNEY

INVENTOR.
MAURICE ARTZT
BY John V. Regan
Attorney

Dec. 12, 1967 M. ARTZT 3,357,533

PRINTER HAVING PRINT BARS WITH ZIGZAG STRUTS OUT OF PHASE

Filed Aug. 6, 1965 5 Sheets-Sheet 5

INVENTOR.
MAURICE ARTZT
BY John V. Regan
ATTORNEY

United States Patent Office 3,357,533
Patented Dec. 12, 1967

3,357,533

PRINTER HAVING PRINT BARS WITH ZIGZAG STRUTS OUT OF PHASE

Maurice Artzt, Princeton, N.J., assignor to Radio Corporation of America, a corporation of Delaware Filed Aug. 6, 1965, Ser. No. 477,875
7 Claims. (Cl. 197—1)

This invention relates to printers and, in particular, to an improved print head structure for use in a serial printer.

A serial printer is one in which characters are printed seriatim at selected, successive print locations along a document print line. One advantage of a serial printer is that it is relatively simple and inexpensive as compared to a parallel printer or an "on-the-fly" printer, and requires little or no buffering or memory. An example of a serial printer is the so-called facsimile or matrix printer in which each different character is made up of a distinctive group of small "picture" elements.

In one known matrix printer, the picture elements of a character are printed column by column from carbon paper by the pressure between seven parallel, independently movable print bars and a scanning anvil. The print bars are located on one side of the document with the carbon paper, and extend across the entire width of the document. These print bars are individually controlled by electromagnets and are movable in a direction generally perpendicular to the surface of the document or paper stock. The anvil is located on the opposite side of the paper stock and moves at constant speed from one end of the print line to the other. A character is printed by selective energization of the electromagnets during a series of timed intervals during which the anvil is moved a distance corresponding to the width of a printed character.

A requirement of many printers is that they be able to print multiple copies. In order to print at high speed, the print bars should be located as close to the paper as possible. However, if the print bars have a fixed rest position close to the paper, the distance between the print bars and the top paper will vary as a function of the number of copies being printed. So too, the distance which the print bars travel and the printing force which they develop will vary as a function of the number of copies being printed, unless the rest positions of the print bars are readjusted when the number of copies is changed.

The necessity of adjusting the rest positions can be avoided by arranging for the print bars to have a self-adjusting, variable rest position in which they are in contact with the top sheet of paper stock. This requires that the print bars be of very light weight construction, whereby they can essentially "float" in light contact with the paper without exerting any substantial pressure thereon. As is known, however, print bars of very light weight construction tend to flex and twist away from their normal path of movement during printing, wtih the result that the printed characters become distorted. Smearing also may result. This undesirable movement and result can be prevented by stacking the print bars in a fairly tight array, with adjacent bars in contact with one another. However, such stacking gives rise to large areas of frictional contact between adjacent print bars, with the result that the printing speed is reduced and the drive force required of the electromagnets is increased. Also, an activated print bar may drag an adjacent, inactive print bar into printing position.

It is a principal object of this invention to provide an improved print head which does not suffer the foregoing limitations and disadvantages.

It is another object of this invention to provide an improved print head comprising print bar structures of light weight construction.

It is still another object of this invention to provide an improved print head comprising print bar structures of light weight construction which are stacked in a close array, but which do not have large areas of frictional contact between adjacent structures.

In apparatus embodying the invention, each printer bar structure comprises first and second elongated members held in fixed spatial relation by a plurality of interposed supporting struts arranged in a regular zigzag pattern along the lengths of the members. The zigzag patterns of struts of adjacent structures are out of phase with one another, the struts of each structure being transverse to adjacent struts of next adjacent structures. Therefore, there are only small areas of frictional contact between struts of adjacent structures when the structures are disposed in side-by-side relationship. Preferably, the thickness of the struts is slightly greater than the thickness of the first and second elongated members.

In the accompanying drawing, like reference characters denote like components, and:

Figure 1:
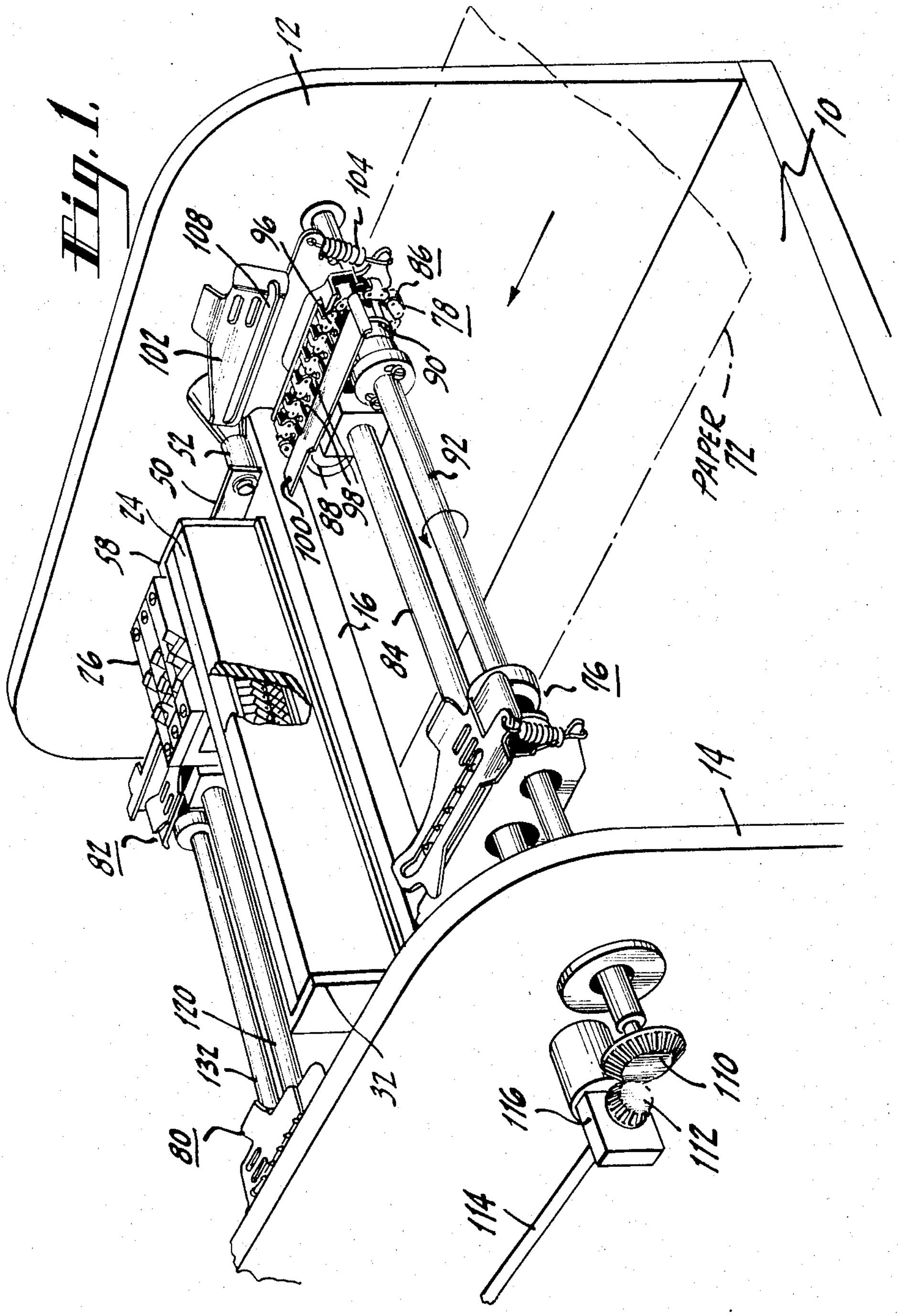
FIGURE 1 is a view in perspective of a printer embodying the novel print head of the present invention.
Figure 2:
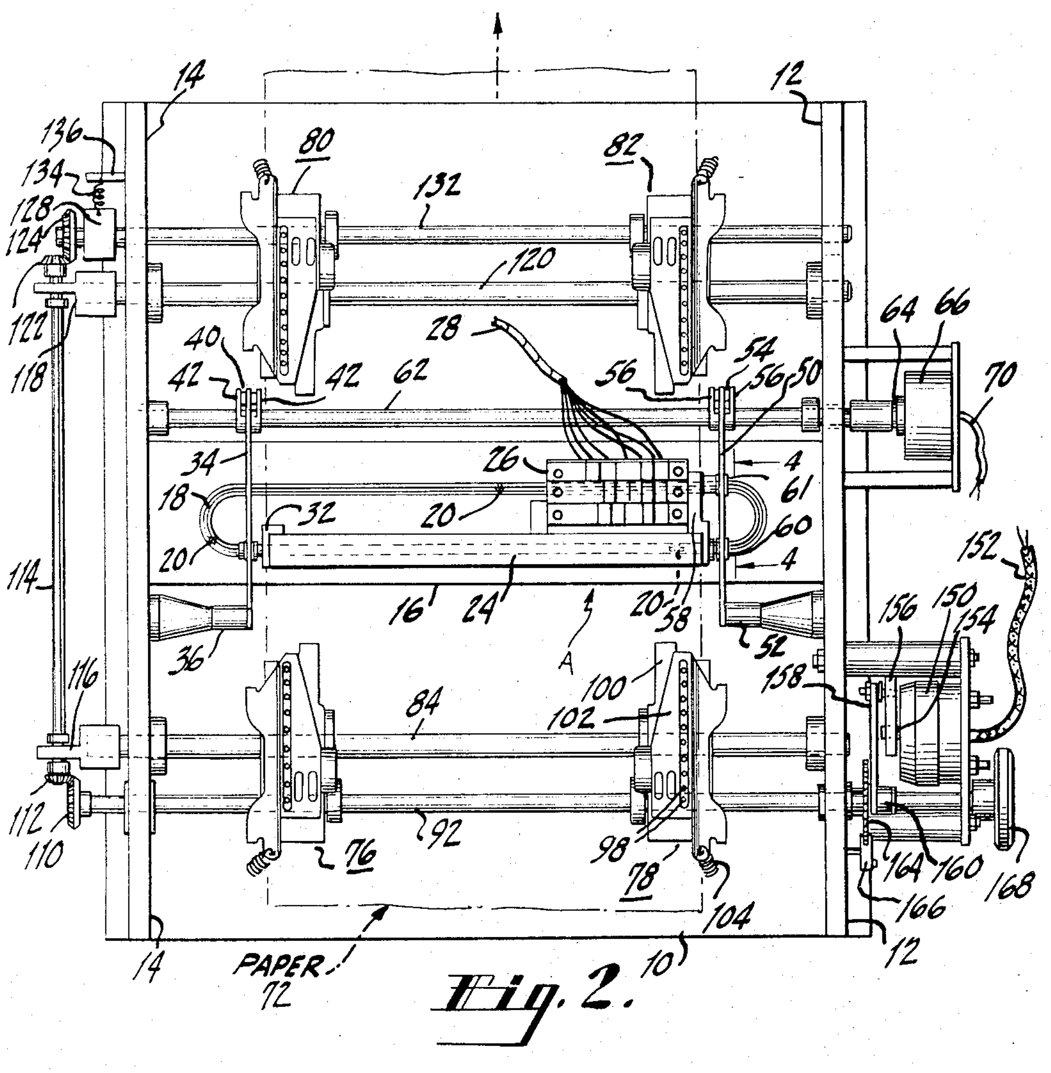
FIGURE 2 is a plan view of the printer.

The overall printer system will first be described in general terms, after which various portions of the system will be described in detail. Reference should first be had to FIGURES 1 and 2. As shown therein, the printer system is supported by and between a pair of vertical side plates 12, 14 which, in turn, are mounted on, or otherwise supported by, a horizontal base plate 10. A platen 16 extends between, and is supported by, the side plates 12, 14 in an elevated position. The top surface of platen 16 lies in a horizontal plane and has a generally oval-shaped raceway 18 (FIGURE 2) therein. Several rolling anvil assemblies 20, three of which are shown in FIGURE 2, are driven continuously along the raceway in a counterclockwise direction. The forward and rear sections of the raceway are straight.

Figure 3:
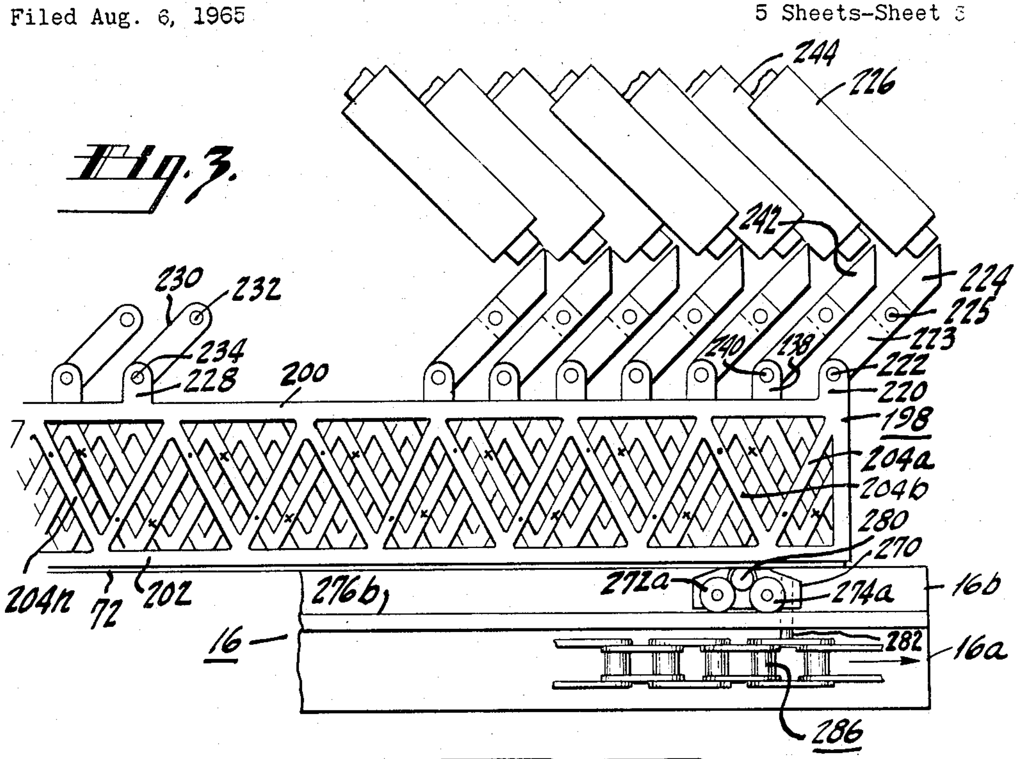
FIGURE 3 is a fragmentary view in front elevation, taken in the general direction of arrow A of FIGURE 2, and showing details of the printer bar structures and their cooperation with the scanning anvil.

Positioned above platen 16 is a print head contained with a housing 24 and comprising a plurality of elongated printer bar structures. These elongated structures extend from one end of the housing to the other and overlie a forward, straight section of raceway 18. The printer bar structures are illustrated in FIGURE 3 and will be described in detail hereinafter. A portion of these structures may be seen in FIGURE 1 through the cutout in the front of housing 24. As will be described, the individual printer bar structures are pivotally mounted for movement toward and away from platen 16. At the back right side of the printer bar housing is a solenoid block 26 which houses a plurality of solenoids for individually driving the printer bar structures. Signals are applied to the individual solenoids by way of separate leads in a cable 28.

At the left side of the printer bar housing, as viewed in FIGURE 2, is an end plate 32 to which the housing 24 is affixed. Plate 32 is pivotally pinned to a lifting bar 34 which is pivotally pinned at its forward end to a stud 36 mounted on side plate 14. The other end of bar 34 overlies a horizontal rod 40 carried by and between a pair of vertical cam members 42. A similar lifting bar assembly is located at the right side of the printer bar housing and comprises a lifting bar 50 pivotally pinned at its forward end to a stud 52 mounted on side plate 12. The back end of lifting bar 50 overlies a horizontal rod 54 carried by and between a pair of vertical cam members 56. Bar 50 is pivotally coupled at 60 to an end plate 58 affixed at the right end of the printer bar housing 24. As illustrated in FIGURE 2, end plate 58 may also serve as a support for the solenoid block 26. Cam members 42 and 56 are fixedly mounted on a cam shaft 62, which is rotatable in bearings (not shown) in side walls 12 and 14. The right hand end of the shaft projects through an aperture in side plate 12 and is coupled to the shaft 64 of a rotary solenoid 66.

Documents to be printed are movable along a feed path between the top of platen 16 and the bottom of printer bar housing 24. Thus, the printer bar structures comprising the print head are located above the document at the print station, and the anvil assemblies 20 move beneath the document. The anvil assemblies are so spaced from one another that only one anvil assembly moves beneath the printer bars at any one time. The document may be one having a carbon backing. Alternatively, a separate sheet of carbon may be provided for each document at the print station.

The printer system is designed to handle documents in the form of continuous sheets of white and carbon paper stock supplied from rolls or from a fanfold stack (not shown). A section of paper stock is illustrated in phantom in the drawing and may be identified by reference character 72. Multiple copies may be printed simultaneously by feeding a sheaf of interleaved carbons and paper stock through the print station from different supply rolls (not shown). The paper stock and carbons are of the type which have sprocket feed holes near both side edges.

Located at the front of the printer is a pair of paper feed tractor assemblies 76, 78. A like pair of tractor assemblies 80, 82 is located at the rear of the printer. These assemblies are alike in construction, wherefore only assembly 78 will be described in detail. This assembly is mounted on a fixed supporting rod 84 and includes (FIGURE 1) an endless chain 86 carried by a pair of spaced wheels 88 and 90. Wheel 88 is an idler wheel which is part of the tractor assembly proper. Wheel 90 is a drive wheel which is mounted on a tractor shaft 92. Shaft 92 extends through apertures in the side walls 12, 14 and is rotatable in bearings therein.

Each of the links in chain 86 has a projecting tab 96 which carries an upstanding sprocket tooth 98. Both the chain 86 and the sprocket teeth 98 lie in planes which are parallel to the side walls 12 and 14. A horizontal platform 100 for supporting the paper is fixedly attached to the assembly. The sheaf of paper stock and carbons rests on platform 100 with the top sprocket teeth 98 projecting upwards through the sprocket holes in the sheaf. A retaining member 102 is hinged on the tractor assembly and is adapted to clamp down loosely on the top of the sheaf to assure that the sprocket holes in the sheaf of papers are maintained in cooperation with the sprocket teeth 98. The retaining member 102 is shown in an upright position in FIGURE 1 for receiving a new document. After the document is properly positioned on the tractor assemblies 76, 78, 80 and 82, the retaining members of the various assemblies are moved to the horizontal or paper retaining position (see assembly 76, for example) and held in that position by bias springs 104. Retaining member 102 has an elongated slot 108 through which the top sprocket teeth 98 project when the retaining member is in the horizontal position.

All of the tractor assemblies are movable. Ordinarily, of course, tractor assembly 78 is clamped in a fixed position on rod 84, and drive wheel 90 is clamped to tractor shaft 92. However this entire assembly may be unclamped and slid along rod 84 and shaft 92. The other tractors are similarly movable. Thus, paper stock of various widths can be accommodated.

A first bevel gear 110 is fixedly mounted on the left end of tractor shaft 92. Cooperating therewith, and driven thereby when tractor shaft 92 rotates, is a second bevel gear 112 mounted on the forward end of a pinion shaft 114. The latter shaft is supported near its forward end in a bearing housing 116 mounted on the left end of rod 84, and is supported near its back end in a bearing housing 118 (FIGURE 2) on the left end of fixed rod 120. A third bevel gear 122 is mounted on the back end of pinion shaft 114 and drives a fourth bevel gear 124. Fourth bevel gear 124 drives the back tractor shaft 132 by way of a spur gear differential housed in a box 128. A first sun gear (not shown) of the differential is pinned to fourth bevel gear 124 and driven thereby. The second sun gear of the differential is mounted on the end of back tractor shaft 132. The spider containing the planetary gears is spring biased by a spring 134 connected to a pin 136, and the bias spring urges the spider in a direction to maintain the paper flat and under tension in the area between the forward and rear tractor assemblies. During the printing of a line of information, the tractor shafts 92 and 132 are stationary. For reasons to be discussed later, the sheaf of documents and carbons is pressed down firmly against the platen 16 at this time and held in clamped position by the housing 24. In order to advance the paper when printing of a line thereon is complete, it is first necessary to raise the print head away from the platen. The manner in which this is accomplished may best be seen from a consideration of FIGURES 2 and 6, of which the latter is a side view of the right hand lifting bar arrangement. Cam members 56 are shown therein in the normal or rest position (rotary solenoid 66 de-energized). Lifting bar 50 has its right end overlying the rod 54 carried between the cam members 56.

To lift the printer bar housing, a signal is applied over cable 70 (FIGURE 2) to energize the rotary solenoid 66. When the solenoid is energized, cam shaft 62 is rotated through a given angle in the direction indicated in FIGURE 6, and rotates the cam members 56 through the same angle. When the cam members are rotated, the rod 54 rides along the chamfered edge of lifting bar 50 and causes the bar to pivot in an upward direction about the pivot pin in the stud 52. The end plate 58, and the printer bar housing 24 affixed thereto, are thus moved in an upward direction away from the paper stock. The action of the left hand lifting bar 34 assembly is similar to that just described. Since the end plate 58 is coupled to bar 50 by a pivot pin 60, the end plate may tend to rotate about pin 60, during the lifting operation, due to the weight of the solenoid housing. Rotation is limited to a small angle by means of the pin 61, which is affixed to plate 58 and extends through an oversized aperture 63 in bar 50.

Paper advance is controlled by a rotary solenoid 150, which receives an energizing signal over line 152. The shaft 154 of the solenoid rotates through a given angle when the solenoid is energized and, in turn, rotates a link 156 through the given angle. Pinned at the end of link 156 is an arm 158 which is coupled at its forward end to tractor shaft 92. Coupling may be made by way of a cam clutch 160 or other clutch arrangement of a type wherein the clutch grips the tractor shaft instantaneously when the arm 158 is rotated in a first direction by the energized solenoid, and wherein the clutch is freely rototable in the opposite direction. In particular, when solenoid 150 becomes energized, the back end of arm 158 is driven in a downward direction by link 156 and, in turn, rotates tractor shaft 92 a given amount in the direction indicated in FIGURE 1. Back tractor shaft 120 is rotated synchronously, in the same direction, through the gear train described previously. When solenoid 150 becomes de-energized, the back end of arm 158 is driven in an upward direction by link 156 to the rest position. However, arm 158 does not rotate shaft 92 during its upward movement because of the action of the clutch 160. In order to prevent movement of the paper in the opposite direction, a ratchet wheel 164 is mounted near the right end of tractor shaft 92. A pawl arm 166 is biased into engagement with the ratchet wheel and prevents rotation of the latter in a counterclockwise direction, as viewed from the right side of the printer. A paper 72 also may be moved manually any given amount by turning the knob 168 on the end of tractor shaft 92.

Figure 4:
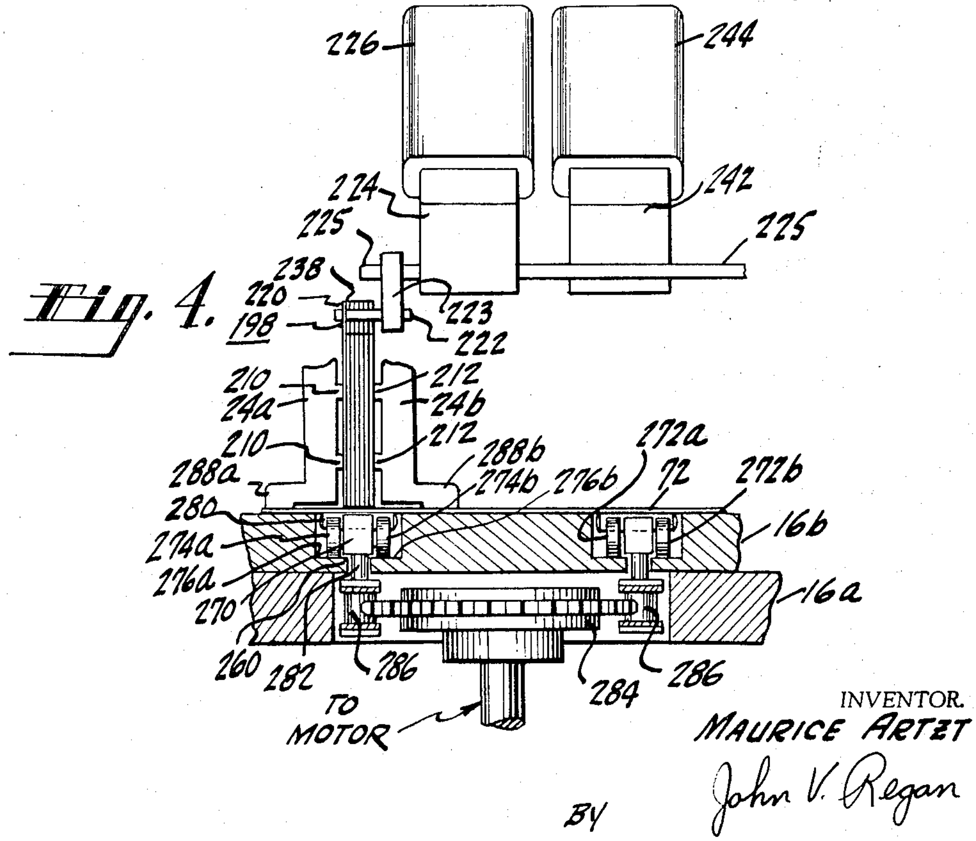
FIGURE 4 is an end view of the print station, taken along the lines 4—4 of FIGURE 3, with the print head mounting bar, end plate and portions of the housing removed.

The printer bar structures of my invention, and their relation to other components at the print station, are shown in detail in FIGURES 3 and 4. A portion of one of the structures is shown in enlarged view in FIGURE 5. Consider the forwardmost printer bar structure in FIGURE 3 by way of example. This structure 198 comprises first and second elongated members 200, 202 which extend from one end of the printer bar housing 24 (FIGURES 1 and 2) to the other, preferably across the entire width of the paper stock. A plurality of supporting struts 204*a* . . . 204*n* are in a regular or repetitive zigzag pattern along the lengths of the elongated members 200, 202, and are joined at their opposite ends to the bottom of member 200 and the top of member 202, respectively. These struts 204*a* . . . 204*n* maintain the elongated members 200, 202 in spaced, parallel relation, whereby the entire structure 198 may be very thin and light in weight, while still retaining structural stability. This is very desirable in the interests of providing a law inertia structure for high speed printing.

The various printer bar structures, seven of which are shown, are stacked in side-by-side relation one behind the other (FIGURE 4), and are held in contact with each other by the front and back sections 24*a* and 24*b* of the printer bar housing. Front housing section 24*a* has a pair of projecting bumper ribs 210 which extend the length of the housing, and back housing section 24*b* has a pair of similar, opposed bumper ribs 212. These ribs 210 and 212, which are in contact with the struts of the first and last printer bar structures, respectively, provide side support for the array, while at the same time presenting only relatively small areas of frictional contact with the struts of the first and last structures.

All of the printer bar structures have their ends aligned. As may be seen in FIGURE 3, the zigzag patterns of struts of adjacent printer bar structures are offset, or "out-of-phase" with each other, preferably by a quarter of a pitch. By "pitch," as that term is used here and in the appended claims, is meant the distance between like points on successive sections of a pattern, for example, the distance P in FIGURE 5. Preferably also, the offsetting of zigzag patterns progresses in the same direction from the first structure to the last.

By offsetting the zigzag patterns of adjacent structures, the struts of any structure are transverse to the adjacent struts of next adjacent structures (see FIGURE 3). Thus, there is only a small area of frictional contact between each pair of those adjacent struts. If there were no offsetting of patterns, those adjacent struts would be in frictional contact throughout their entire lengths. On the other hand, when the zigzag patterns of struts of next adjacent structures are out-of-phase by a quarter of a pitch, alternate struts of one structure are in frictional contact with alternate struts of the adjacent structure at areas near the tops of those struts, and the remaining struts of the one structure are in frictional contact with the remaining struts of that adjacent structure at areas near the bottoms of those struts.

By way of illustration, the general areas of contact between the struts of the first and second structures lie behind the dot (·) markings in FIGURE 3. The general areas of frictional contact between the struts of the second and third structures lie behind the (*x*) markings. It will be noted that the upper contact areas (e.g. areas marked by "*x*" and "·") of the several print bar structures do not lie one behind the other. The same is true of the lower contact areas. This means that there is no aligned touch point throughout the struts of the several print bar structures to cause binding of the structures in the stacked array. It should also be noted that all of the upper areas of frictional contact between the struts of the various printer bar structures lie in a first horizontal plane, while all of the lower areas of frictional contact lie in a second horizontal plane. For reasons to be explained, this arrangement is important in preventing "wobbling" of the printer bar structures. On the other hand, if the zigzag patterns of struts of adjacent structures were out-of-phase by one-half pitch, all of the areas of frictional contact would be at the centers of the struts. There would then be a plurality of aligned touch points from the front to the back of the array, with the result that the printer bar structures might bind. Also, the structures would tend to wobble when moved, causing distorted printing.

Some contact between adjacent printer bar structures is necessary, as explained above, to lend structural stability to the array and to prevent the individual structures from wobbling. However, the frictional contact should be held to a minimum consistent with stability, since otherwise large driving forces are required for the structures. More important, if the friction between adjacent structures is too great, a driven structure may drag an inactive structure into printing position. Frictional contact is further reduced in the print head of my invention in the manner best described in connection with FIGURE 5. That portion of the structure above dashed lines AA and below dashed lines BB is made thinner on one side than the remainder of the structure. Accordingly, the only areas of frictional contact between adjacent printer bar structures are the previously discussed areas of contact between adjacent struts and the contacting areas of the vertical end pieces 206.

Figure 5:
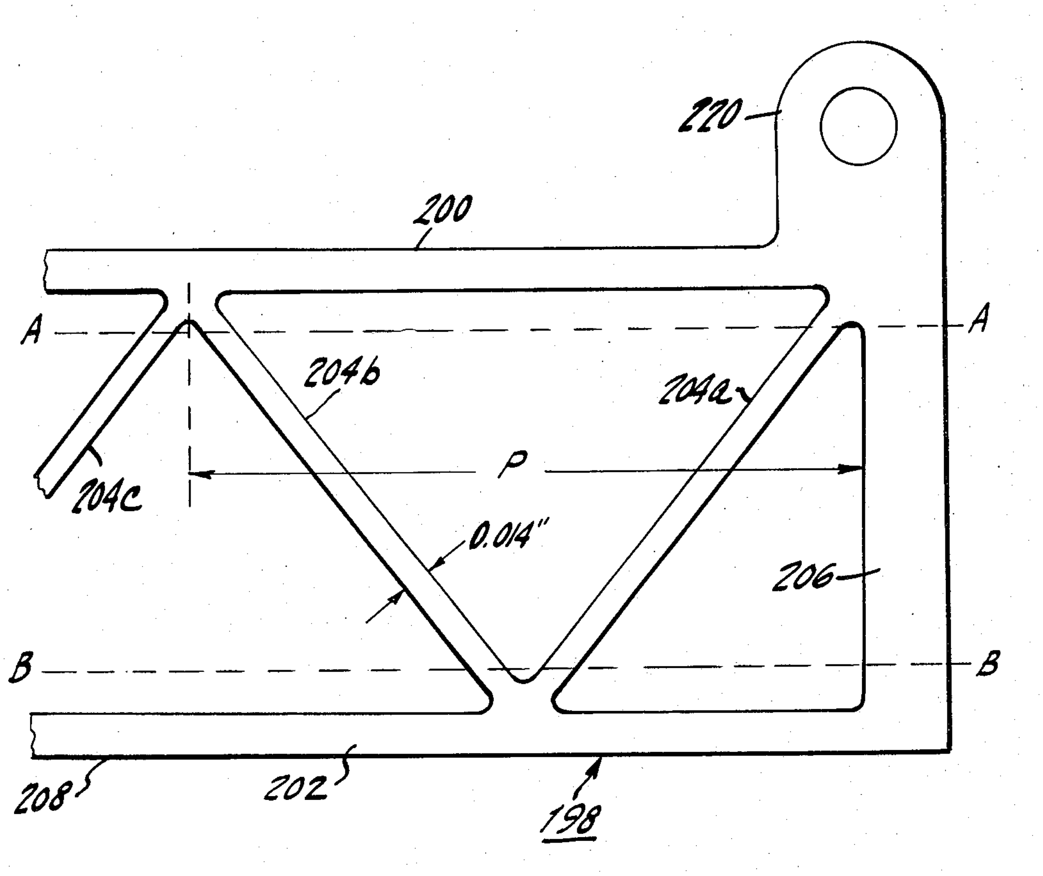
FIGURE 5 is an enlarged view in front elevation of a portion of the forwardmost printer bar structure.

An entire printer bar structure, e.g. structure 198, preferably is manufactured as a unitary structure from a common plate, for example, of stainless steel. The pattern of struts may be formed by chemically etching the stainless steel plate. After the etcing process the thickness of the structure, in the plane of the paper, FIGURE 5, may be about 0.014 inch, and the widths of the struts may be the same. One surface of the structure, e.g. the back surface, then is ground to about 0.012 or 0.013 inch above line A—A and below line B—B. The finished structure may weigh on the order of one gram. All of the printer bar structures for a print head then may be assembled, and the bottom, printing surfaces 208 ground flat, with the edges rounded slightly (FIGURE 5).

In the stacked array (FIGURES 3 and 4), each of the printer bar structures is pivotally suspended for "pantographic" movement toward and away from the platen 16 and paper 72. Forwardmost structure 198 has a vertically projecting tab 220 at the top right end thereof. A pivot pin 222 extends through an aperture in the tab 220 and is affixed at its other end to a crank arm 223 which is fastened to the shaft 225 of the armature 224 in a first solenoid 226. Armature 224 rotates shaft 225 when solenoid 226 is energized. Although it is not clearly shown in FIGURE 4, the left end of shaft 25 may be supported in a bearing in the rear housing section 24*b*, and the right end of the shaft 225 may be supported in a bearing in the back wall of the solenoid housing block 26 (FIGURE 1). Structure 198 also has one or more other vertically projecting tabs spaced along the length of the member 200. One of these latter tabs 228 is illustrated in FIGURE 3 and is pivotally pinned to a link 230 which, in turn, is mounted on a pivot pin 232. The other tabs (not shown) projecting from member 200 are similarly arranged. Thus, the entire printer bar structure 198 can swing through a small arc about shaft 225 and pivot pin 232.

Elongated members 200 and 202 are parallel to one another. When pivot pin 232 and shaft 225 lie in a horizontal plane, and the distance between pin 222 and shaft 225 is the same as that between pins 232 and 234, the entire bottom surface of elongated member 202, which is the printing surface, is always in a horizontal plane and parallel to the paper, regardless of the angular position of the armature 224. Each of the other printer bar structures is similarly mounted. Tab 238 at the right end of the second printer bar structure, for example, is pivotally mounted on a pin 240 which is affixed at its back end to a crank arm fixed to the shaft of the armature 242 of solenoid 244.

Platen 16 preferably comprises a pair of plates 16*a* and 16*b* which are sandwiched together. The oval-shaped raceway 18 (FIGURE 1) is located in the top surface of upper plate 16*b* and is rectangular in cross section with a through slot 260 at the bottom center thereof, as best seen in end view in FIGURE 4. The printer bars are located above the straight section at the front of the raceway, and the anvil assemblies ride in the rectangular channel and are driven continuously around the raceway.

Preferably, the anvil assemblies are of the type described and illustrated in detail in the copending application of Charles J. Young, Ser. No. 477,789, entitled Printer, which is is filed concurrently herewith and assigned to the assignee of the present invention. One such anvil assembly is shown in side view in FIGURE 3, and two of the assemblies are illustrated in end view in FIGURE 4. Briefly stated, the anvil assembly comprises a carriage body 270 borne on a pair of front and back rollers. Each roller may comprise a pair of wheels 272*a*, 272*b* or 274*a*, 274*b* on a common axle. Each side wall of the carriage body has a rounded notch in the top edge thereof, and a cylindrical anvil pin 280 is cradled in the notches. The depth of the notch is such that the top longitudinal surface of the anvil pin projects above the top of the side walls. The notches are slightly larger than the diameter of the anvil pin 280, whereby the pin is free to rotate in the notches. Further, the centers of the notches are so located relative to the axles that the anvil pin 280 is in frictional contact with all of the wheels and is driven thereby when the carriage is moved.

The anvil assembly rides in the raceway with its wheels riding on the bottom lips 276*a*, 276*b* of the channel which lips serve as tracks for the carriage wheels. The height of the anvil assembly is such that the top surface of the anvil pin is in the same plane as the top surface of plate 16*b*. A vertical pin 282 projects from the bottom of the carriage and rides in the slot 260 at the bottom of the channel. The portion of bottom plate 16*a* is hollow in the area defined by the raceway. A first, drive wheel 284 is located in the hollow at one end of the raceway, and a second, idler wheel (not shown) is located in the hollow at the opposite end of the raceway. A link chain 286, best seen in FIGURE 3, is carried by the drive and sprocket wheels, which have sprocket teeth which mesh with the spaces between the links of the chain. Drive wheel 284 is driven continuously at constant speed. Projecting pin 282 of the carriage assembly is attached to one of the links of the chain, whereby the assembly is driven at constant speed around the raceway. Although the anvil pin 280 is in contact with the bottom surface of the paper, there is no tendency for the pin to drag the paper in the direction of anvil movement, because of the rolling action of the anvil pin.

The printer bar structures are so suspended (FIGURE 3) that they are free to pivot under their own weight into light contact with the top of the paper. However, because of the light weight construction of the print bar structures, and the rolling action of the anvil pin, there is insufficient pressure therebetween to cause printing when no printer solenoid is energized. An advantage of so arranging the rest positions of the printer bar structures is that the printer bar structures need only move a very short distance to effect printing. By way of example, a printer bar structure may move about 0.003 inch when its solenoid is energized. A further advantage of the spatial relationship is that the activated printer bar structures move about the same distance regardless of the number of copies in the sheaf. Thus, there is no need to make printer adjustments when the number of copies is changed. This assumes, of course, that there are no substantial air pockets between the various carbons and papers.

Figure 6:
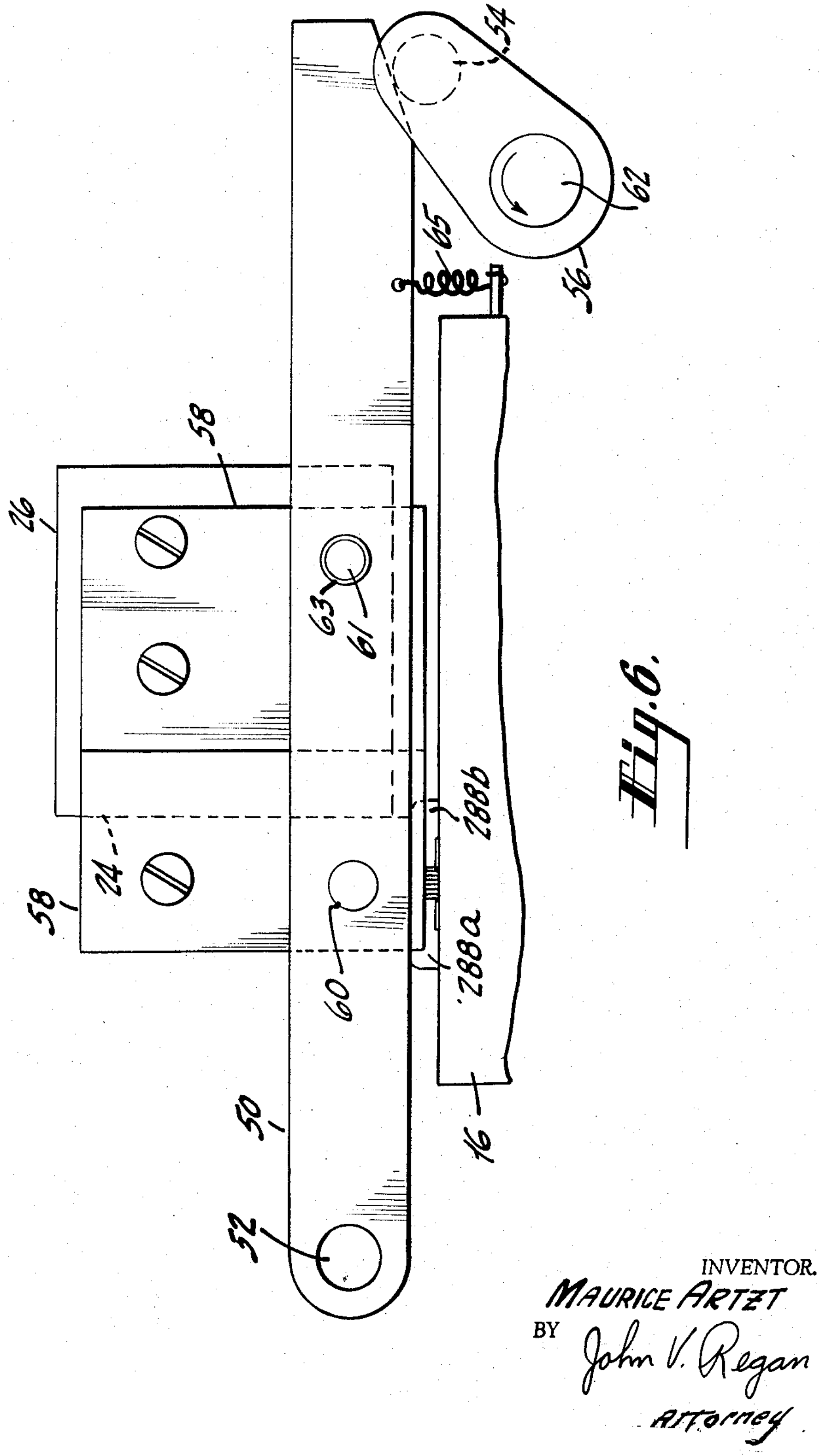
FIGURE 6 is a side view of one of the print head mounting and positioning assemblies.

To assure this condition, the front and back sections 24*a*, 24*b* of the printer bar housing are provided with elongated legs 288*a* and 288*b*, respectively, which extend the length of the housing, and which are adapted to rest on the top of the sheaf of papers. The spacing between the legs 288*a* and 288*b* is slightly greater than the width of the channel in top platen plate 16*b*, whereby the bottom faces of the legs press the sheaf of paper firmly against the top of platen plate 16*b*. By so clamping the paper tightly between the legs 288*a*, 288*b* and the plate 16*b*, the air is squeezed out from between the various carbons and papers. As a result, the driving force required of the solenoids to produce readable print on all copies is greatly reduced. The printer bar housing is biased into paper clamping position by a low rate spring 65 (FIGURE 6). Further details of the paper clamping arrangement are given in the copending application of Everett J. West, Ser. No. 477,871, entitled, Printer, which is filed concurrently herewith and assigned to the assignee of the instant invention.

Figure 7:
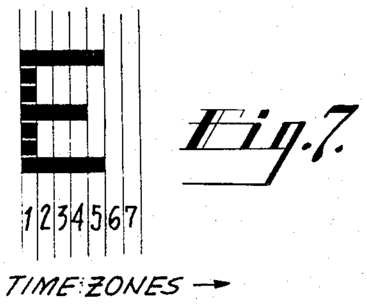
FIGURE 7 is a diagram illustrating the printing technique.

Printing is effected by energizing selected ones of the printer solenoids as an anvil pin 280 scans along beneath the paper and the printer bar structures. Each character in the print line is printed in a series of columnwise steps at a desired location in the print line as the anvil pin is moved a distance equal to a character width at the desired location. FIGURE 7 illustrates the manner of printing the capital letter E.

The motion of the scanning anvil may be considered to be divided into time zones, there being seven time zones per character. Five of the time zones are used for actual printing, and two of the time zones are provided for intercharacter spacing. During each time zone, as the anvil rolls beneath the paper, one or more of the printer solenoids may be energized to drive its printer bar structure in a downward direction to force the paper and carbon against the scanning anvil. To print the capital letter E, all of the solenoids are energized during a first time period, designated "1" in FIGURE 7. The first, middle and last printer bar structures also have their solenoids energized during the time periods designated "2, 3 and 4" in FIGURE 7, and the solenoids for the first and last printer bar structures are additionally energized during the time period designated "5." The slight spacing between the "picture elements" in the first column of FIGURE 7 are due to the fact that the struts of the printer bar structures are slightly thicker than the printing surfaces of the structures, as mentioned previously.

What is claimed is:

1. In a printer, the combination comprising:
   - a plurality of printer bar structures disposed in side-by-side relationship;
   - each printer bar structure including first and second elongated members held in fixed spatial relation by a plurality of interposed supporting struts arranged in a zigzag pattern along the lengths of the first and second members;
   - the zigzag patterns of struts of adjacent printer bar structures being out of phase with one another with the individual struts of each printer bar structure being transverse to the adjacent struts of next adjacent printer bar structures; and means for supporting said printer bar structures for individual movement toward and away from a document to be printed.

2. In a printer, the combination comprising:

a document path for receiving a document to be printed;

a plurality of planar printer bar structures disposed in side-by-side relationship on one side of said path and normal thereto;

each printer bar structure having first and second elongated, spaced members and a plurality of struts arranged in a regular zigzag pattern along the lengths of said first and second members and being joined thereto for maintaining the first and second members in spaced relation;

each of the first members having a printing surface facing said document path;

the zigzag patterns of adjacent printer bar structures being out of phase with one another, whereby the individual struts of each printer bar structure are transverse to the adjacent struts of next adjacent printer bar structures; and means supporting said printer bar structures for independent movement toward and away from said document path.

3. The combination as claimed in claim 2, wherein the zigzag pattern of struts of adjacent printer bar structures are out of phase by approximately a quarter of a "pitch."

4. The combination as claimed in claim 2, including first and second side members pressing the printer bar structures together and maintaining adjacent printer bar structures in contact with one another.

5. The combination as claimed in claim 2, including first and second side members having elongated bumper ribs in contact with the struts of the first and last printer bar structures, respectively and maintaining each printer bar structure in contact with next adjacent printer bar structures.

6. The combination as claimed in claim 5, wherein the portions of the struts of adjacent printer bar members that contact each other have a greater thickness than the thickness of the first and second members.

7. The combination as claimed in claim 2, wherein said supporting means comprises means for pivotally supporting each printer bar structure at at least two locations along the length of the second members.

References Cited

UNITED STATES PATENTS

| | | | |
|---|---|---|---|
| 2,136,265 | 11/1938 | Petty | 244—119 X |
| 2,325,900 | 8/1943 | Anderson | 244—119 X |
| 2,389,767 | 11/1945 | Dalton | 244—119 X |
| 2,656,240 | 10/1953 | Hell | 197—1 X |
| 2,659,652 | 11/1953 | Thompson | 101—93 X |
| 2,790,697 | 4/1957 | Wockenfuss | 197—1 X |
| 2,909,996 | 10/1959 | Fitch | 101—93 |
| 2,976,801 | 3/1961 | Dirks | 101—93 |
| 3,155,032 | 11/1964 | Antonucci | 101—93 X |
| 3,157,456 | 11/1964 | Kikuchi | 346—78 |
| 3,144,821 | 8/1964 | Drejza | 101—93 |
| 3,164,083 | 1/1965 | Irvine | 101—93 |
| 3,223,029 | 12/1965 | Simshauser | 346—78 X |

OTHER REFERENCES

"Friction and Wear of Materials," book by Ernest Rabinowicz, published in 1965 by John Wiley and Sons Inc., New York, Library of Congress Catalog Card No. 65-12704. Copy in Scientific Library. Pp. 32-37, 52-59 and 64 relied on.

ROBERT E. PULFREY, *Primary Examiner.*

EDGAR S. BURR, *Assistant Examiner.*